US012752852B2

(12) United States Patent
Lee et al.

(10) Patent No.: US 12,752,852 B2
(45) Date of Patent: Oct. 6, 2026

(54) SIDE SILL FOR VEHICLE

(71) Applicant: POSCO Co., Ltd, Pohang-si (KR)

(72) Inventors: Gyu-Min Lee, Incheon (KR); Gi-Suk Chung, Incheon (KR); Kyung-Hwan Chung, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 629 days.

(21) Appl. No.: 18/028,076

(22) PCT Filed: Oct. 8, 2021

(86) PCT No.: PCT/KR2021/013911
§ 371 (c)(1),
(2) Date: Mar. 23, 2023

(87) PCT Pub. No.: WO2022/086005
PCT Pub. Date: Apr. 28, 2022

(65) Prior Publication Data

US 2023/0339543 A1 Oct. 26, 2023

(30) Foreign Application Priority Data

Oct. 19, 2020 (KR) ........................ 10-2020-0135174

(51) Int. Cl.
*B62D 21/15* (2006.01)
*B62D 25/02* (2006.01)

(52) U.S. Cl.
CPC ......... *B62D 21/157* (2013.01); *B62D 25/025* (2013.01)

(58) Field of Classification Search
CPC ............................ B62D 25/025; B62D 21/157
(Continued)

(56) References Cited

U.S. PATENT DOCUMENTS 6,409,257 B1 6/2002 Takashina et al.
9,045,175 B2 * 6/2015 Mori .................. B62D 25/2036
(Continued)

FOREIGN PATENT DOCUMENTS

CN 110155181 A 8/2019
JP 2009-262614 A 11/2009
(Continued)

OTHER PUBLICATIONS

International Search Report dated Jan. 5, 2022, issued in International Patent Application No. PCT/KR2021/013911 (with English translation).
(Continued)

*Primary Examiner* — Joseph D. Pape
(74) *Attorney, Agent, or Firm* — Morgan Lewis & Bockius LLP

(57) ABSTRACT

The present disclosure relates to a side sill for a vehicle, wherein the side sill is capable of absorbing an impact during lateral collision of the vehicle to maximally suppress the degree to which the side sill enters the interior, and protecting vehicle occupants and batteries. The side sill for a vehicle comprises: a side sill inner panel; a side sill outer panel coupled to the side sill inner panel; and a first cushioning member disposed between the side sill inner panel and the side sill outer panel and constituting a plurality of closed cross-sections arranged in the width direction of the side sill. The first cushioning member includes a main body formed by bending a single plate, and at least one partition member connecting both surfaces of the main body. A plurality of beads may be formed on the main body and the partition member.

17 Claims, 15 Drawing Sheets

(58) Field of Classification Search
USPC .......................................................... 296/209
See application file for complete search history.

(56) References Cited

U.S. PATENT DOCUMENTS

| | | | | |
|---|---|---|---|---|
| 10,155,542 | B2 * | 12/2018 | Gao | B62D 21/157 |
| 10,293,862 | B1 * | 5/2019 | Patel | B62D 21/15 |
| 10,988,181 | B2 * | 4/2021 | Watanabe | B62D 25/20 |
| 2012/0248825 | A1 | 10/2012 | Tamura | |
| 2016/0200371 | A1 | 7/2016 | Inamoto | |
| 2018/0065678 | A1 | 3/2018 | Tutzer | |
| 2019/0248416 | A1 | 8/2019 | Kato et al. | |
| 2019/0256150 | A1 | 8/2019 | Cooper et al. | |
| 2020/0262491 | A1 | 8/2020 | Shannon et al. | |

FOREIGN PATENT DOCUMENTS

| | | | |
|---|---|---|---|
| JP | 5427895 | B2 | 12/2013 |
| JP | 2014-51116 | A | 3/2014 |
| JP | 2016-052834 | A | 4/2016 |
| JP | 2016-60472 | A | 4/2016 |
| JP | 2016-097739 | A | 5/2016 |
| JP | 2019-137353 | A | 8/2019 |
| KR | 1997-0041179 | A | 7/1997 |
| KR | 10-0233500 | B1 | 9/1999 |
| KR | 10-2014-0044681 | A | 4/2014 |
| KR | 10-2015-0137156 | A | 12/2015 |
| KR | 10-1973585 | B1 | 4/2019 |
| WO | 2012/101923 | A1 | 8/2012 |
| WO | 2016/060255 | A1 | 4/2016 |
| WO | 2020/070935 | A1 | 4/2020 |
| WO | 2020/120068 | A1 | 6/2020 |
| WO | 2020/136265 | A1 | 7/2020 |

OTHER PUBLICATIONS

Office Action dated Apr. 18, 2025 issued in corresponding Chinese Patent Application No. 202180070968.X with the English translation. (Note: JP 2016-052834 A and KR 10-2014-0044681 A already submitted).

Office Action issued Feb. 6, 2024 for Japanese Patent Application No. 2023-517857.

Extended European Search Report issued Mar. 19, 2024 for European Patent Application No. 21883076.8.

* cited by examiner

【FIG. 1】
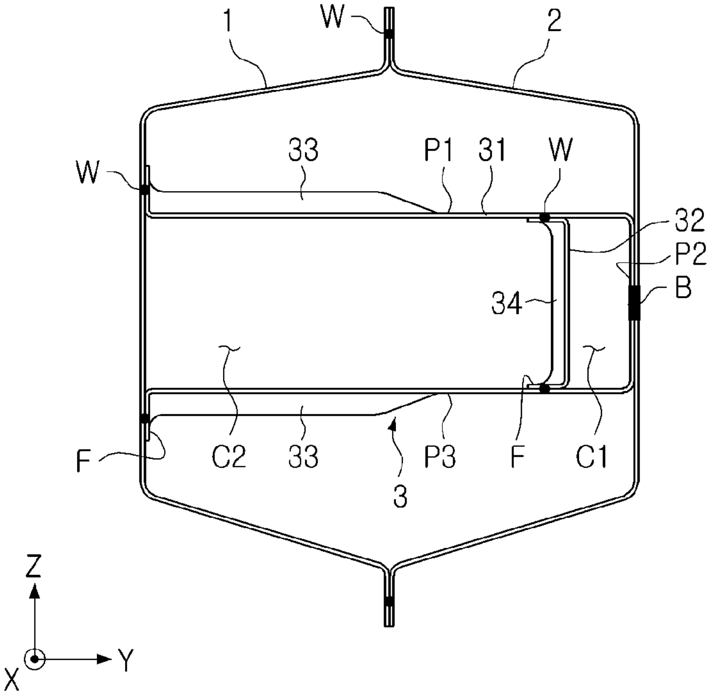

【FIG. 2】
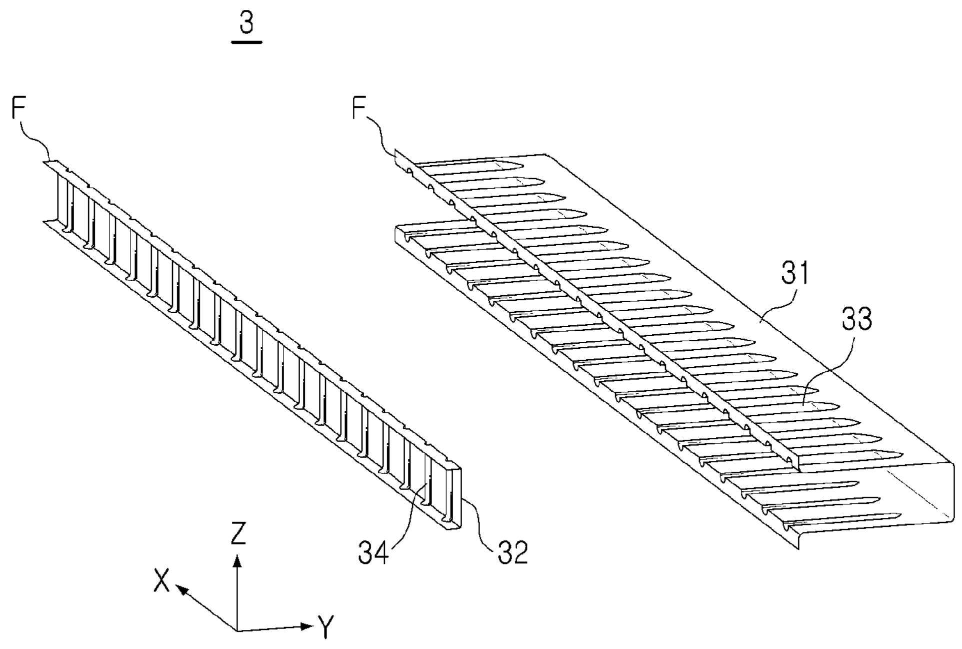

【FIG. 3】
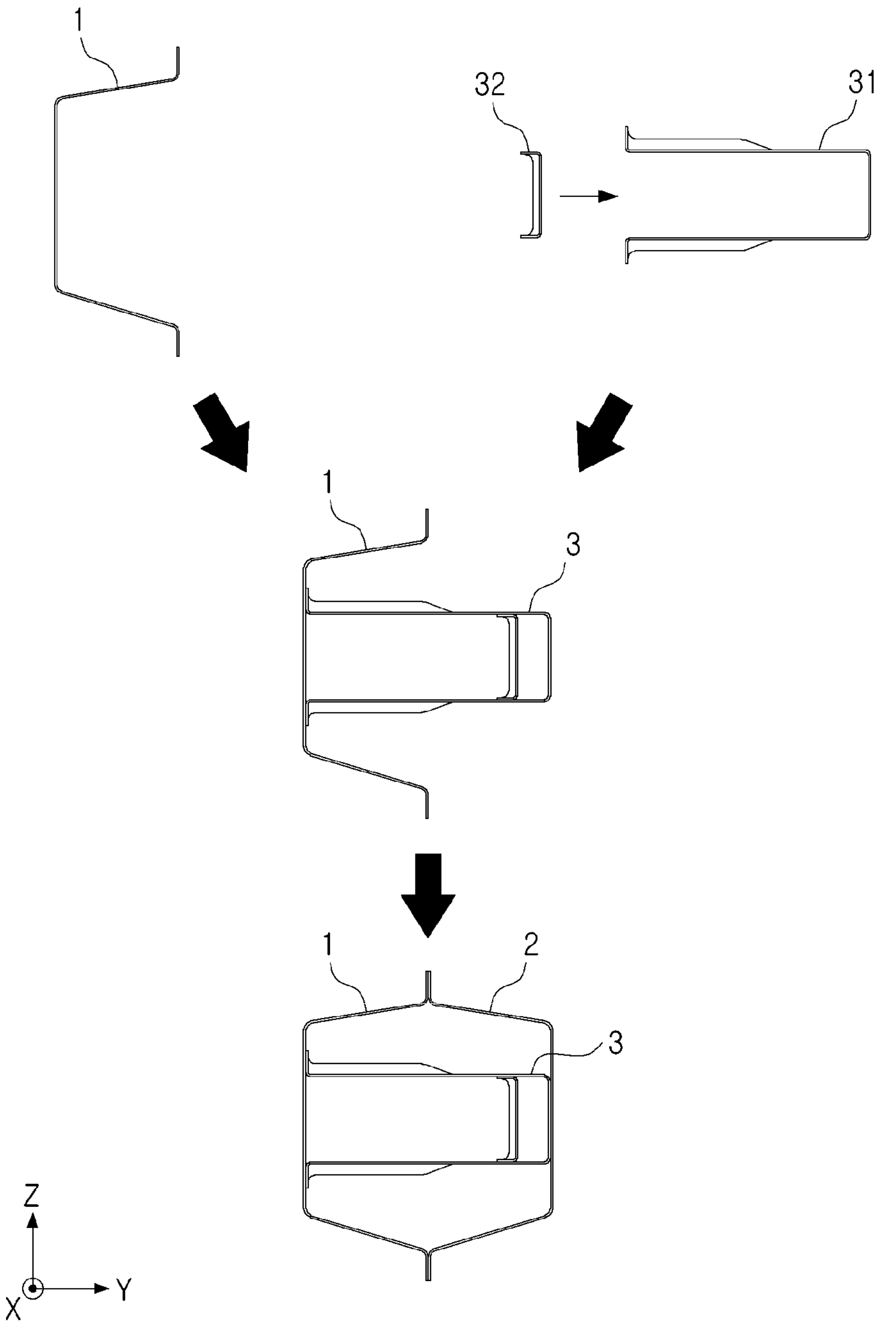

【FIG. 4】
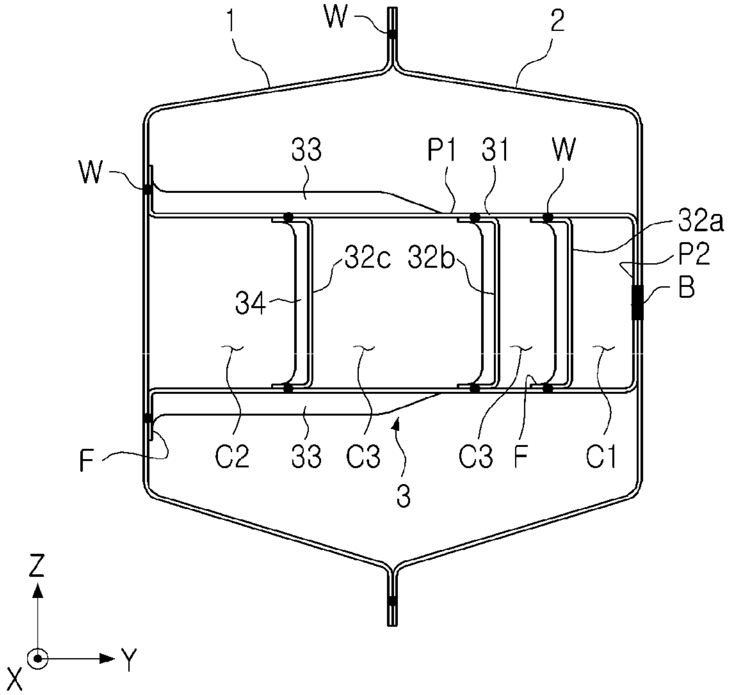

【FIG. 5】
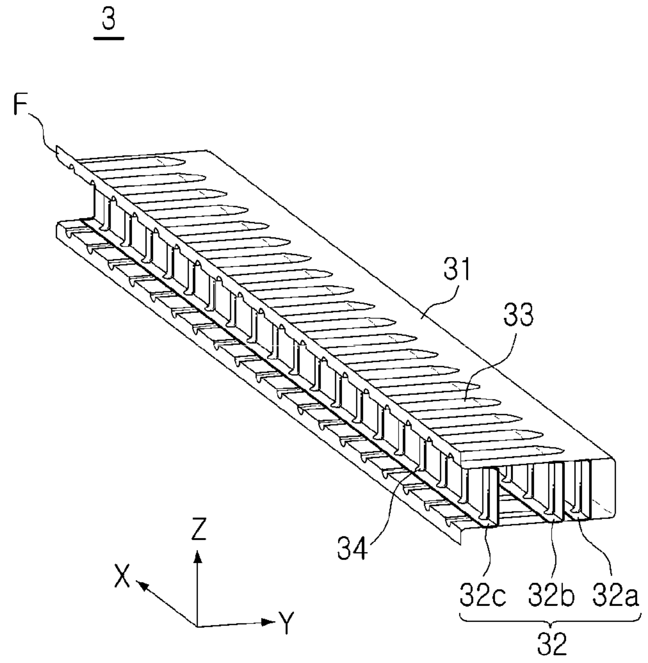

【FIG. 6】
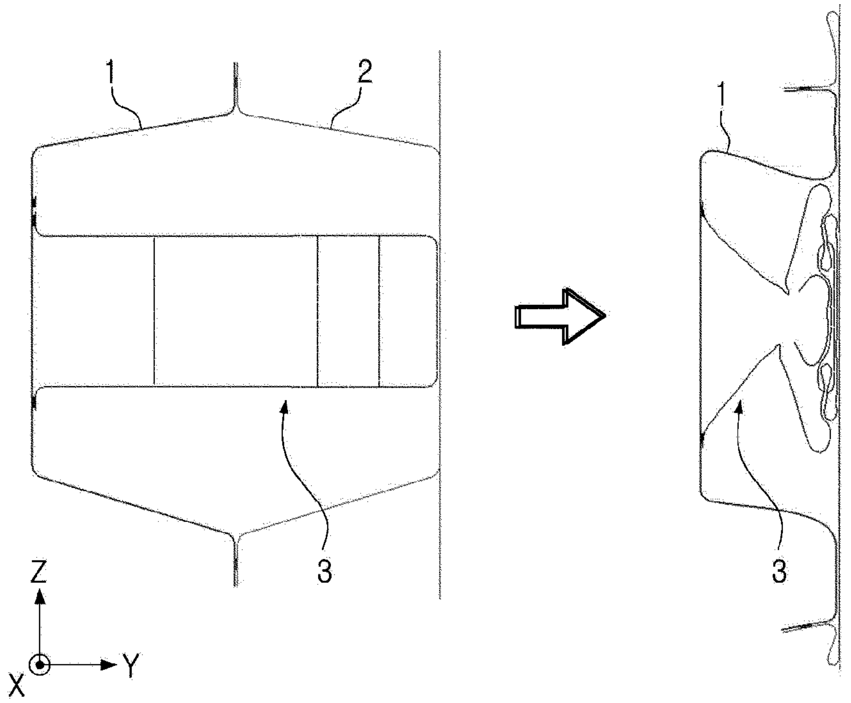

【FIG. 7】
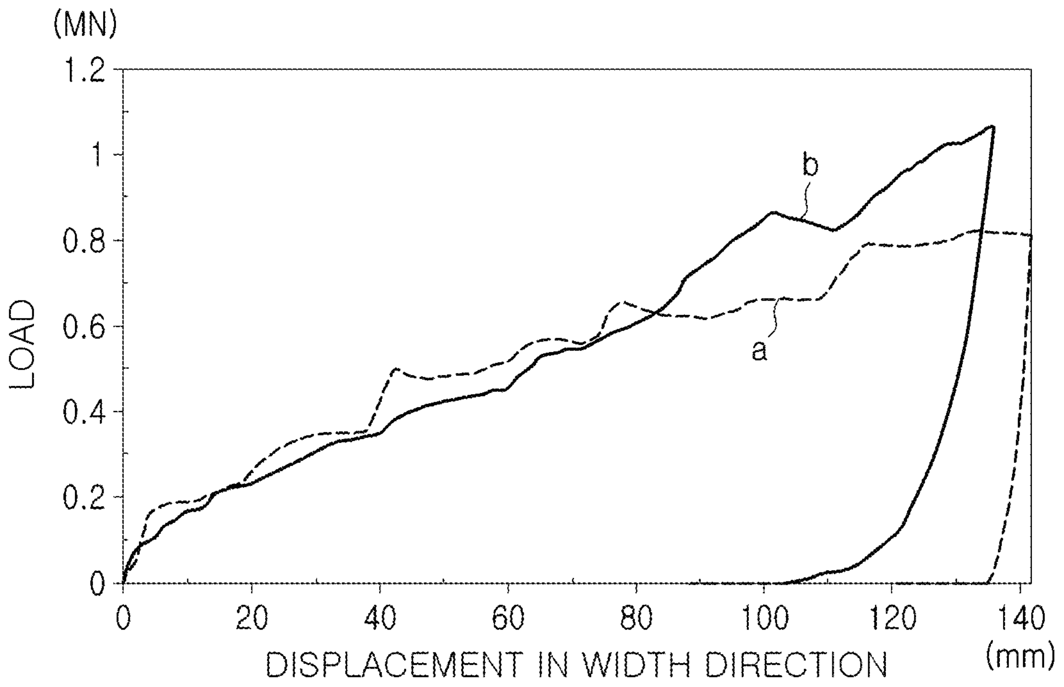

【FIG. 8】
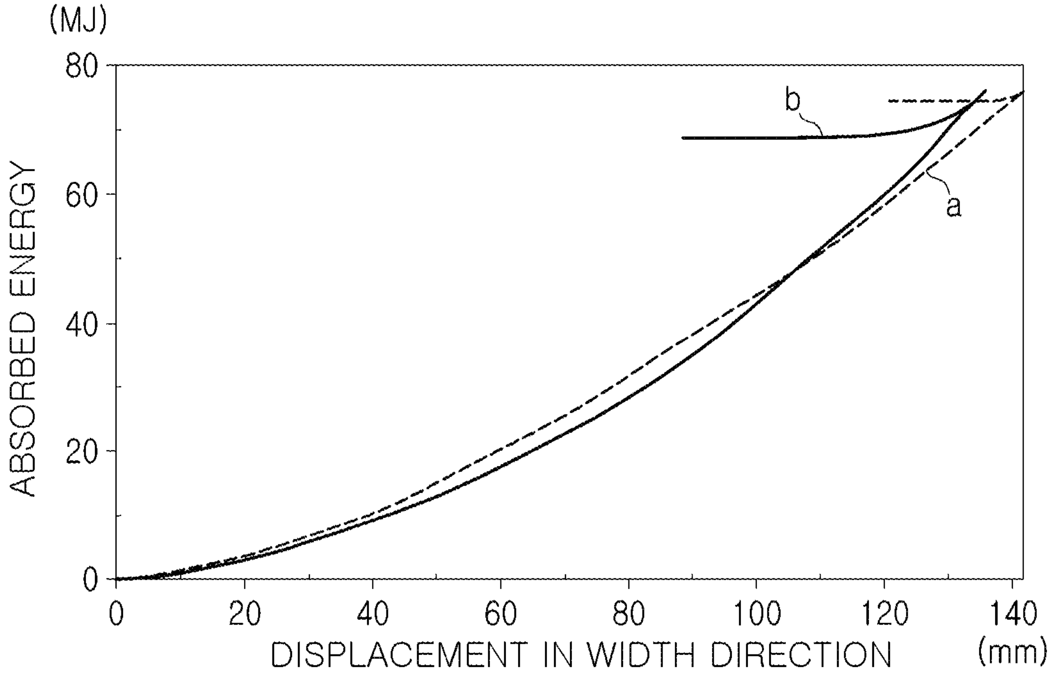

【FIG. 9】
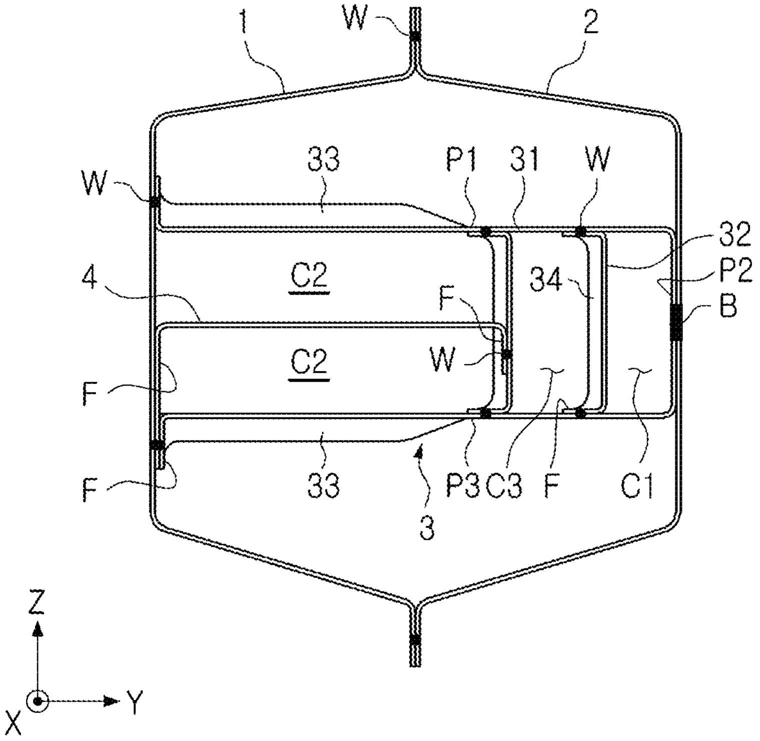

【FIG. 10】
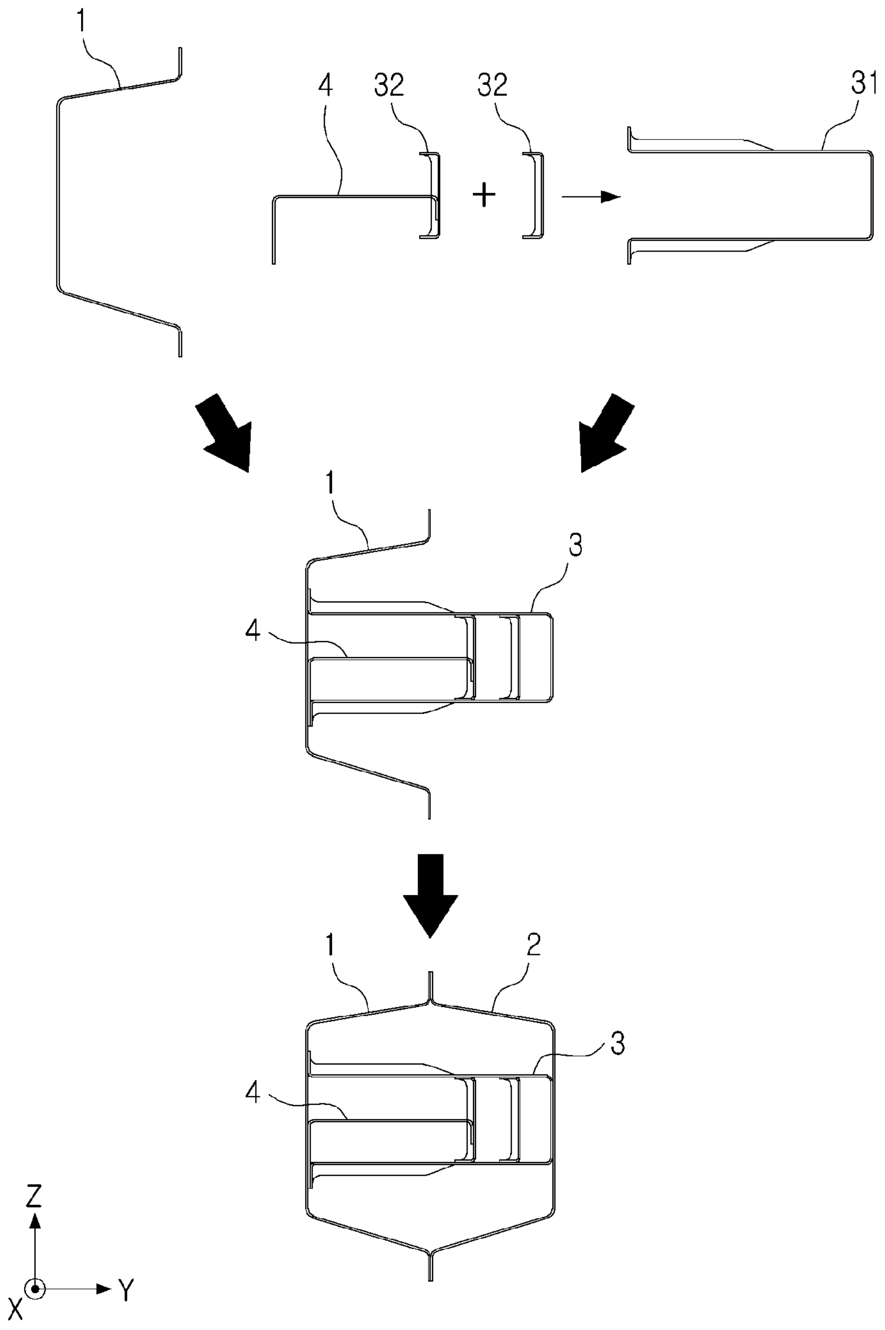

【FIG. 11】
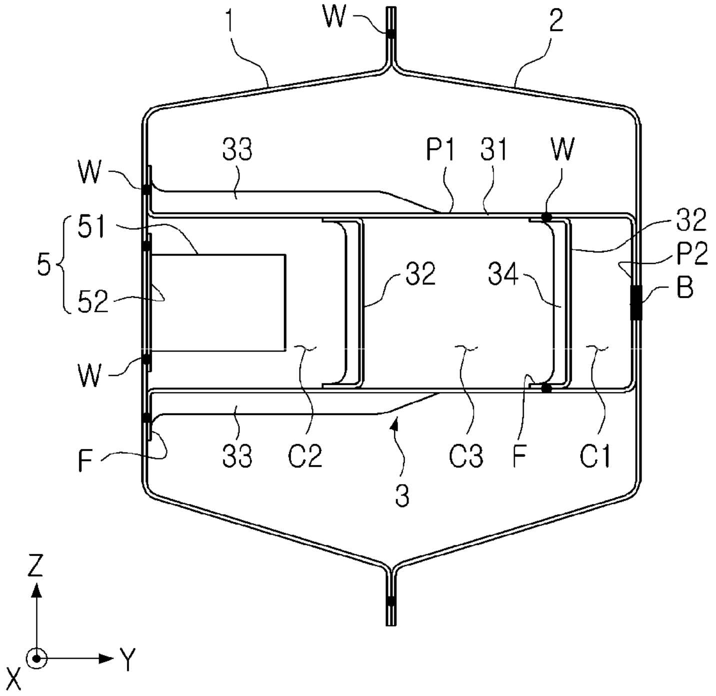

【FIG. 12】
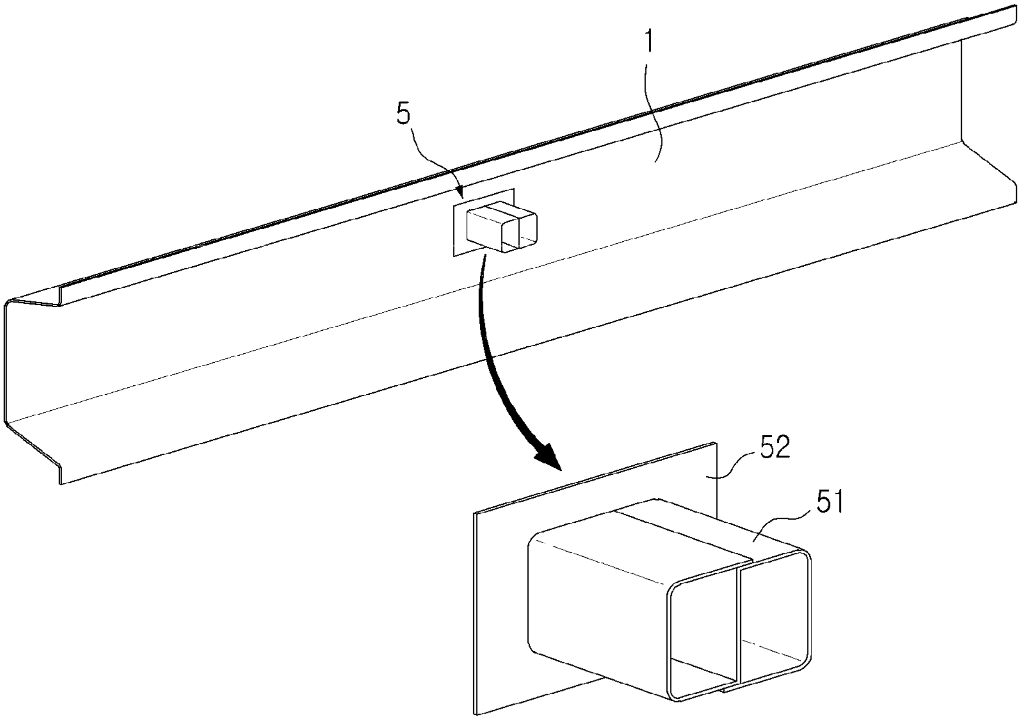

【FIG. 13】
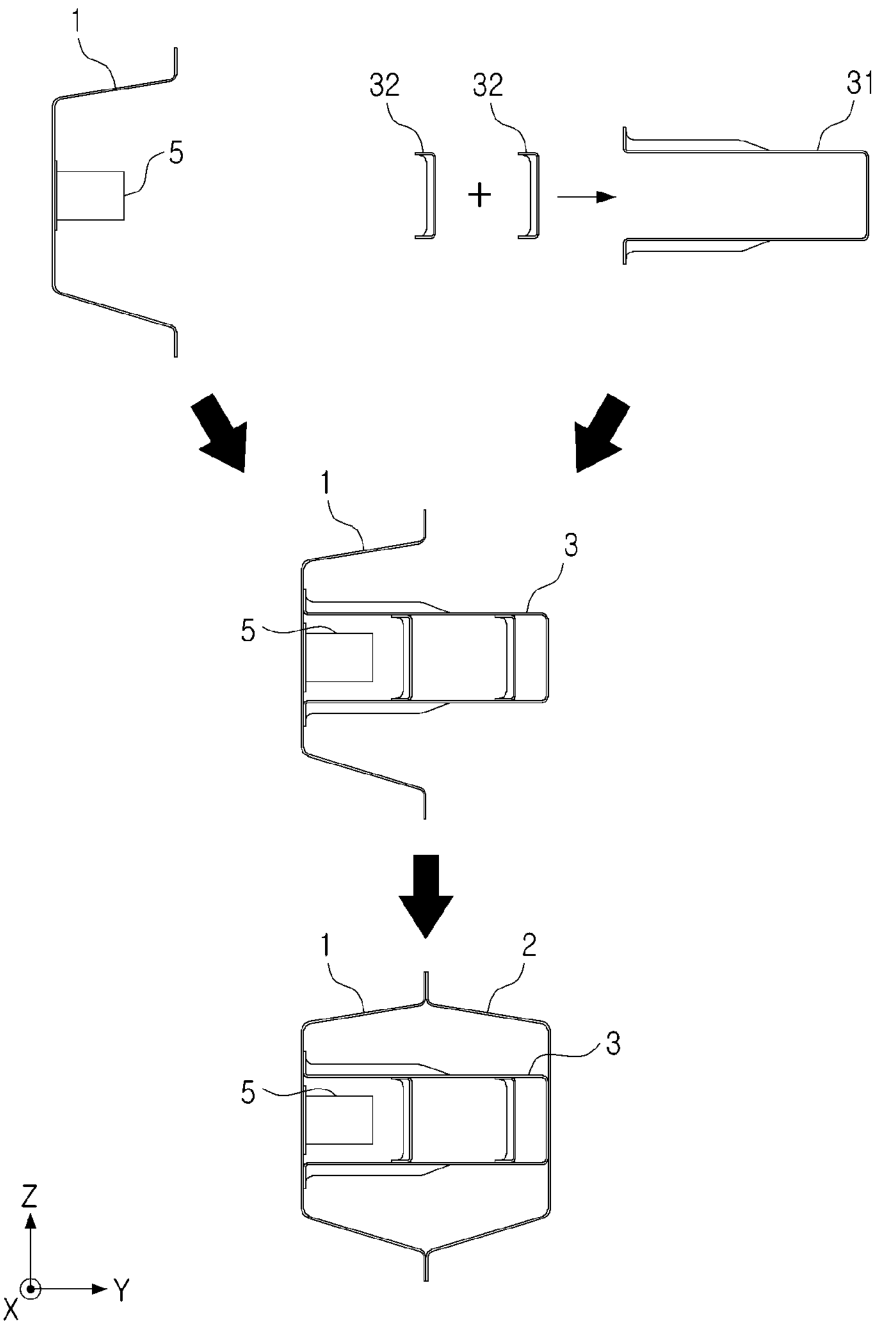

【FIG. 14】
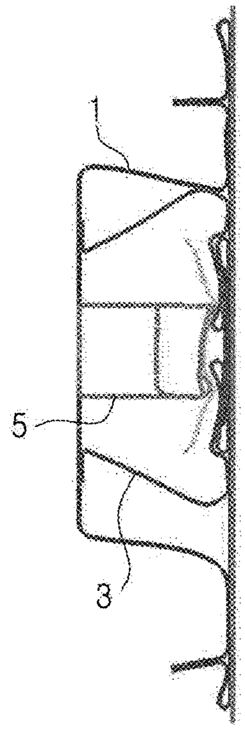

【FIG. 15】
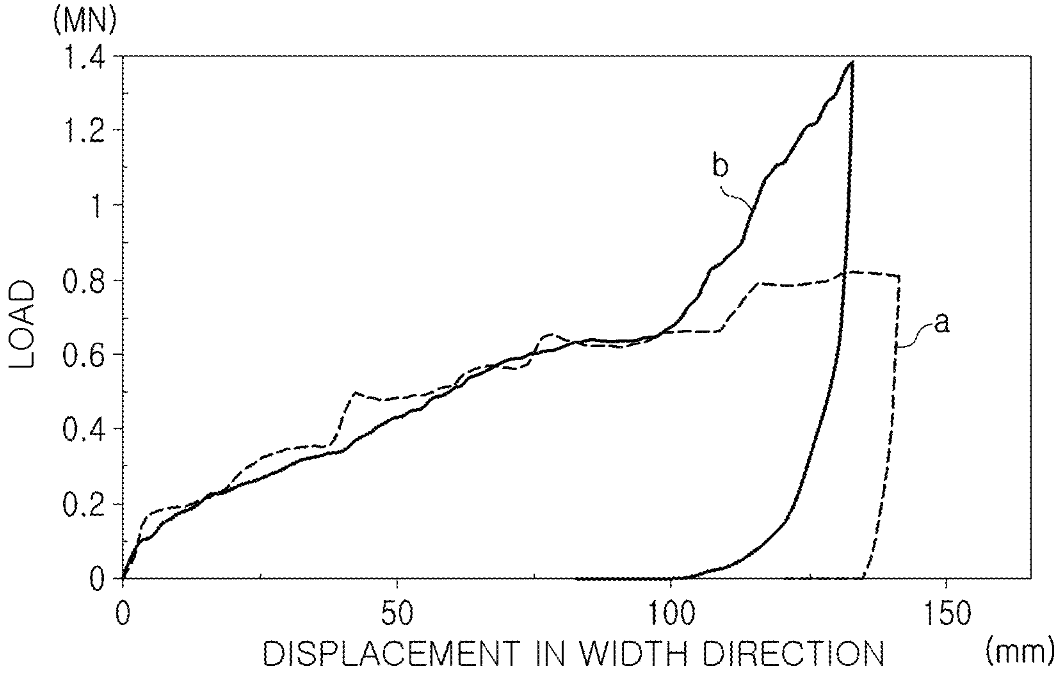
【FIG. 16】
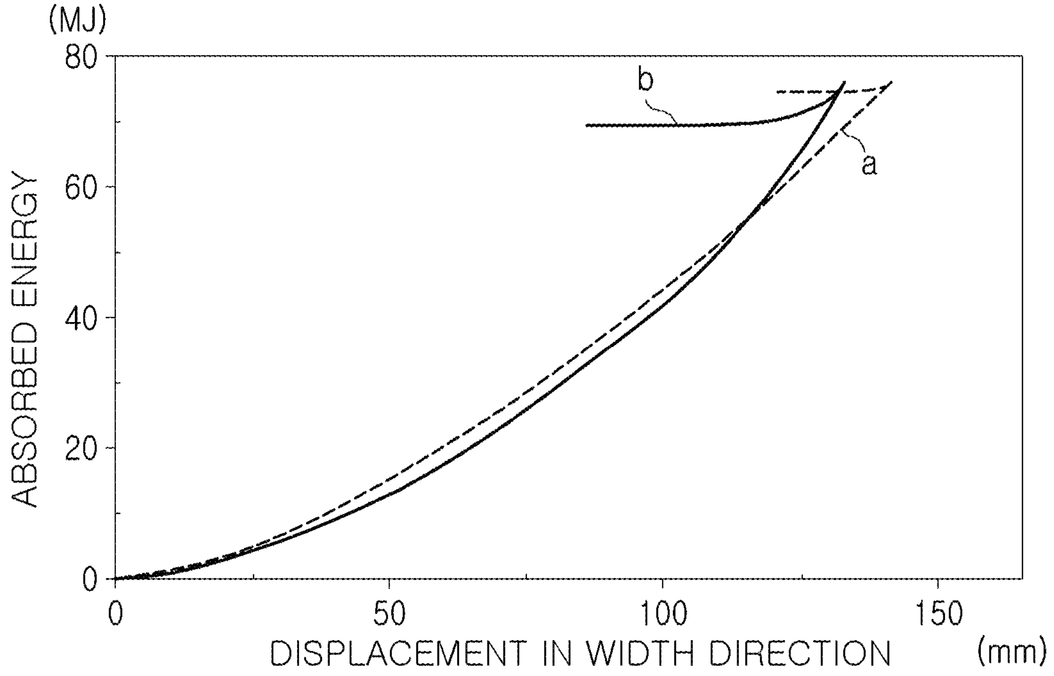

SIDE SILL FOR VEHICLE

CROSS-REFERENCE OF RELATED APPLICATIONS

This application is the U.S. National Phase under 35 U.S.C. § 371 of International Patent Application No. PCT/KR2021/013911, filed on Oct. 8, 2021, which in turn claims the benefit of Korean Application No. 10-2020-0135174, filed on Oct. 19, 2020, the entire disclosures of which applications are incorporated by reference herein.

TECHNICAL FIELD

The present disclosure relates to a side sill for a vehicle capable of absorbing an impact, for example, during lateral collision of the vehicle to maximally suppress a degree to which the side sill enters the interior, and protecting an occupant and a battery.

BACKGROUND ART

In general, a side body of a vehicle, such as an electric vehicle, includes a side sill extending in a longitudinal direction of the vehicle at a lower portion of the side body, and pillars having one end coupled to the side sill and the other end extending in a height direction of the vehicle. The pillars act as supports for the body, and the side sill acts as an important body structure in response to front and side collisions of the vehicle.

The side sill may include a side sill inner panel and a side sill outer panel. Here, when an inside of the side sill is empty, buckling is likely to occur under various collision conditions. Accordingly, the inside of the side sill is reinforced in various manners. For example, a reinforcing member may be included inside the side sill.

However, the conventional side sill has a very fragile structure to sufficiently absorb lateral collision energy during the lateral collision of the vehicle. In the lateral collision of the vehicle, the side sill is severely deformed due to the stress concentration phenomenon of the side sill, and as a result, the degree to which the side sill enters the interior increases, so the degree of injury to a pelvis, among injuries to a human body of an occupant, is large.

In addition, in the case of an electric vehicle, not only an occupant but also a battery disposed in a large space on a floor surface needs to be protected.

(Patent Document 1) JP 6439401 B2

DISCLOSURE

Technical Problem

The present disclosure provides a side sill for a vehicle capable of absorbing an impact, for example, during a lateral collision of the vehicle to maximally suppress a degree to which the side sill enters an interior, and protecting an occupant and a battery.

Technical Solution

In an aspect of the present invention, a side sill for a vehicle may include: a side sill inner panel; a side sill outer panel coupled to the side sill inner panel; and a first cushioning member disposed between the side sill inner panel and the side sill outer panel and constituting a plurality of closed cross-sections arranged in a width direction of the side sill, in which the first cushioning member includes a main body formed by bending a single plate, and at least one partition member connecting both surfaces of the main body, and a plurality of beads are formed on the main body and the partition member.

The side sill for a vehicle may include a second cushioning member inserted into one of the plurality of closed cross-sections of the first cushioning member and extending in the width direction of the first cushioning member.

Advantageous Effects

As described above, according to the present disclosure, by arranging cushioning members inside a side sill and giving a shape for absorbing an impact, it is possible to absorb an impact during the lateral collision of the vehicle through the self-deformation and support stiffness of the cushioning member to maximally suppress a degree to which the side sill enters an interior, to thereby safely protect an occupant and a battery.

BRIEF DESCRIPTION OF THE DRAWINGS

FIG. 1 is a cross-sectional view of a side sill for a vehicle according to a first embodiment of the present disclosure.

FIG. 2 is an exploded perspective view of a first cushioning member illustrated in FIG. 1.

FIG. 3 is a diagram illustrating a method of assembling the side sill for a vehicle according to the first embodiment of the present disclosure.

FIG. 4 is a cross-sectional view of a side sill for a vehicle according to a second embodiment of the present disclosure.

FIG. 5 is a perspective view of a first cushioning member illustrated in FIG. 4.

FIG. 6 is a diagram illustrating an operation of the side sill for a vehicle according to the second embodiment of the present disclosure.

FIGS. 7 and 8 are graphs illustrating deformation forms through analysis of the side sill for a vehicle according to the second embodiment of the present disclosure.

FIG. 9 is a cross-sectional view of a side sill for a vehicle according to a third embodiment of the present disclosure.

FIG. 10 is a diagram illustrating a method of assembling the side sill for a vehicle according to the third embodiment of the present disclosure.

FIG. 11 is a cross-sectional view of a side sill for a vehicle according to a fourth embodiment of the present disclosure.

FIG. 12 is a perspective view and an enlarged view illustrating an installation state of the second cushioning member illustrated in FIG. 11.

FIG. 13 is a diagram illustrating a method of assembling the side sill for a vehicle according to the fourth embodiment of the present disclosure.

FIG. 14 is a diagram illustrating an operation of the side sill for a vehicle according to the fourth embodiment of the present disclosure.

FIGS. 15 and 16 are graphs illustrating deformation forms through analysis of the side sill for a vehicle according to the fourth embodiment of the present disclosure.

BEST MODE

Hereinafter, exemplary embodiments of the present disclosure will be described in detail with reference to the accompanying drawings. It is to be noted that in giving reference numerals to components of each of the accompanying drawings, the same components will be denoted by the same reference numerals even though they are illustrated in different drawings.

FIG. 1 is a cross-sectional view of a side sill for a vehicle according to a first embodiment of the present disclosure, and FIG. 2 is an exploded perspective view of a first cushioning member illustrated in FIG. 1.

The side sill for a vehicle according to the first embodiment of the present disclosure may include a side sill inner panel 1, a side sill outer panel 2, and a first cushioning member 3.

For example, a vehicle such as an electric vehicle may include a side sill in a lower portion of a side surface thereof. The side sill may be installed on a vehicle body by coupling a side sill inner panel 1 to, for example, a center floor panel (not illustrated) or a rear floor panel (not illustrated).

The side sill inner panel 1 may be coupled to a part of the pillar inner panel (not illustrated) extending in a height direction Z vehicle body. However, the coupling of the filler inner panel is not necessarily limited thereto, and for example, the filler inner panel may be coupled to the side sill outer panel 2.

The side sill inner panel 1 may be coupled to the side sill outer panel 2.

The side sill may be integrally coupled by welding the side sill inner panel 1 and the side sill outer panel 2 at a lower end portion or an upper end portion thereof.

In addition, the upper or lower end portions of the side sill may be treated by a sealer (not illustrated) of the vehicle body in a longitudinal direction X to achieve sealing.

The first cushioning member 3 may be disposed between the side sill inner panel 1 and the side sill outer panel 2.

For example, as illustrated in FIGS. 1 and 2, the first cushioning member 3 may include a main body 31 formed by bending a single plate and a partition member 32 connecting both surfaces of the main body. FIGS. 1 and 2 illustrate an example of the first cushioning member having one partition member.

More specifically, after a plate extends from one end to a predetermined length to form a first surface P1 and then is bent once in a first direction (clockwise direction in FIG. 1). Subsequently, the plate further extends to a predetermined length to form a second surface P2, and then, is bent once more in the same direction, that is, once in the first direction. Subsequently, the main body 31 is completed by extending to a predetermined length to form a third surface P3 and terminating at the other end.

The second surface P2 may constitute a support surface located between the first surface P1 and the third surface P3 on both sides while being located on an opposite side of an open surface of the main body 31.

In this manner, after the desired number of flat surfaces are formed by repeating the method in which the plate extends to a predetermined length and then bent, both ends of the plate may each be bent in the first direction (clockwise direction) or the second direction (counterclockwise direction) to form a flange F.

FIGS. 1 and 2 illustrate an example in which the flange F is formed by bending both ends of the plate in a first direction or a second direction, respectively, and thus, the main body 31 has a substantially hat-shaped cross-sectional shape.

In the side sill for a vehicle according to the first embodiment of the present disclosure, the main body 31 of the first cushioning member 3 may be provided with a plurality of beads 33 that extend in a width direction Y of the vehicle body or the side sill, and are arranged spaced apart from each other along the longitudinal direction X of the first cushioning member or the main body.

More specifically, the plurality of beads 33 may be formed on both surfaces of the main body 31, that is, the first surface P1 and the third surface P3. The beads may extend from the flange F to a length of more than half of the lengths of the first and third surfaces of the main body.

As a result, the plurality of beads 33 may be formed adjacent to the side sill inner panel 1 in the first cushioning member 3 and not formed adjacent to the side sill outer panel 2.

In this manner, the plurality of beads 33 formed on the main body 31 may increase an absorbable load amount by improving the stiffness of the vehicle body or the side sill of the first cushioning member 3 in the width direction Y.

The partition member 32 may be bent so that a single plate has an approximately U-shaped cross-sectional shape, and the flange F for bonding with the main body 31 may be formed at both ends.

Here, the extending length of the flange F may have a range of about 10 to 15 mm in consideration of a bonded portion such as a welded portion W formed by welding. In addition, an interior angle in the bent portion may have a range of about 90° to 120°.

In the side sill for a vehicle according to the first embodiment of the present disclosure, the partitioning member 32 of the first cushioning member 3 may be provided with a plurality of beads 34 that extend in the height direction Z of the vehicle body or the side sill, and are arranged spaced apart from each other along the longitudinal direction X of the first cushioning member or the partition member.

More specifically, the plurality of beads 34 may be formed to connect the both flanges F of the partition member 32. The beads may extend to the same length as the length of the partition member in the height direction Z.

The plurality of beads 34 may be formed to protrude toward the side sill inner panel 1 or protrude toward the side sill outer panel 2.

The plurality of beads 34 formed on the partition member 32 as described above may improve the stiffness of the partition member itself to maintain the function of the partition member preventing both surfaces (e.g., P1 and P3) of the main body 31 from widening during lateral collision.

The main body 31 and the partition member 32 may be made of, for example, a metal material such as steel, and may be molded together with the plurality of beads 33 and 34 by forming or bending using a press, roll forming, a combination thereof, or the like.

When the main body 31 or the partition member 32 is manufactured by the roll forming, it is possible to mold even ultra-high strength steel having a tensile strength of about 980 MPa or more without difficulty. In addition, compared to the forming by the press, the roll forming has the advantage of being easy to compensate for spring back and reducing (0 radius of the main body or the partition member.

The main body 31 and the partition member 32 may be coupled to each other by welding or the like.

More specifically, one flange F of the partition member 32 may be fixed to an inner surface of the first surface P1 of the main body 31 by welding such as spot welding, laser welding, or arc welding using carbon dioxide, etc. The other flange of the partition member may be fixed to an inner surface of the third surface P3 of the main body by welding such as spot welding, laser welding, or arc welding using carbon dioxide, etc.

The length of the partition member 32 in the height direction Z may be formed equal to the length in the height direction Z between the first and third surfaces P1 and P3 on the second surface P2 of the main body 31, and the partition member and the second surface of the main body may be spaced apart from each other at a predetermined distance.

Accordingly, the first surface P1 and the third surface P3 of the main body 31 may be maintained horizontally and may be disposed parallel to each other. As a result, compared to the structure in which the first and third surfaces of the main body are inclined, there is an advantage in that the ability to absorb collision energy is improved and the load of the cross section received vertically is increased.

However, the length of the partition member 32 in the height direction Z is not necessarily limited thereto. For example, the length of the partition member in the height direction may be formed longer than the length of the second surface P2 of the main body 31 in the height direction in order for the partition member to slightly widen the main body.

As a result, the first cushioning member 3 itself may have one first closed cross-section C1 partitioned by the partition member 32. In other words, one first closed cross-section may be formed between the partition member and the second surface P2 of the main body 31.

The first cushioning member 3 may have a length sufficient to almost fill the inside of the side sill of the vehicle body in the longitudinal direction X.

The first cushioning member 3 has one partition member 32 that has a shape bent several times and is formed therein, to thereby secure stiffness against impact energy acting in the front and rear as well as impact energy acting in the side of the side sill.

The flange F provided on the main body 31 of the first cushioning member 3 may be joined to the side sill inner panel 1 by welding such as bi-directional spot welding. Accordingly, the welded portion W may be formed between the flange of the first cushioning member and the side sill inner panel.

As a result, a second closed cross-section C2 may be formed between the first cushioning member 3 and the side sill inner panel 1.

In the side sill for a vehicle according to the first embodiment of the present disclosure, an outer surface of the second surface P2 provided on the main body 31 of the first cushioning member 3 may be applied with an adhesive to be bonded to an inner surface of the side sill outer panel 2. Accordingly, a bonded portion B may be formed between the support surface of the first cushioning member and the side sill outer panel.

However, the formation of the bonded portion is not necessarily limited thereto, and optionally, the bonded portion between the support surface of the first cushioning member 3 and the side sill outer panel 2 may be omitted.

The side sill for a vehicle according to the first embodiment of the present disclosure adopts the first cushioning member 3 that has a shape bent several times and is reinforced with the partition member 32 therein, so the plurality of closed cross-sections C1 and C2 that have a rectangular cross-section inside the side sill and are arranged in the width direction Y of the vehicle body or the side sill may be configured.

In this manner, the side sill for a vehicle according to the first embodiment of the present disclosure has the advantage of being able to easily configure the plurality of closed cross-sections C1 and C2 arranged in the width direction Y even if steel is applied, for example.

The plurality of closed cross-sections C1 and C2 may supplement the support stiffness of the side sill itself, directly receive the impact during the lateral collision of the vehicle, and contribute to minimizing the degree to which the side sill enters the interior.

For example, when the impact is transmitted to the first cushioning member 3 through the side sill outer panel 2 during the lateral collision of the vehicle, the plurality of closed cross-sections C1 and C2 reduce the transmitted impact by using the support stiffness of the complementary linkage structure, and absorb most of the reduced residual impact as the first cushioning member is pushed toward the side sill inner panel 1 and begins to deform.

Therefore, the side sill for a vehicle according to the first embodiment of the present disclosure includes a first cushioning member 3 capable of effectively absorbing an impact due to compressive deformation inside the side sill, to thereby increase the support stiffness of the side sill itself and maximize the ability to absorb an impact by inducing stable crush deformation during a collision. As a result, it is possible to minimize the degree to which the side sill enters the interior during the lateral collision of the vehicle, which has the advantage of maximally protecting the occupant and battery safely.

In addition, in the side sill for a vehicle according to the first embodiment of the present disclosure, the collision performance of the side sill may be secured by adjusting the material of the plate forming the first cushioning member 3 and the strength or thickness of this material. For example, by adopting ultra-high strength steel of 980 MPa or more, an optimal combination for reducing the weight of the side sill may be achieved.

More specifically, the side sill inner panel 1, the side sill outer panel 2, and the first cushioning member 3 may be made of 1470 martensitic (MART) steel or 1180 transformation induced plasticity (TRIP) steel having a thickness of about 1.2 mm to 1.9 mm produced by the present applicant.

Here, the 1470 MART steel is a steel type that has a tensile strength of 1,470 MPa or more and a yield strength of 1,050 MPa or more to improve collision safety, and the 1180 TRIP steel is a steel type that has improved elongation while securing a tensile strength of 1180 MPa or more and a yield strength of 850 MPa or more.

For example, the 1470 MART steel or 1180 TRIP steel may be used alone, for the side sill inner panel 1 and the side sill outer panel 2, or both the 1470 MART steel and TRIP steel may be mixed and used. The 1180 TRIP steel may be used alone for the first cushioning member 3.

In addition, the plate constituting the first cushioning member 3 may have a thicker thickness than the plate of the side sill inner panel 1 and the side sill outer panel 2.

In addition, the thickness of the plate constituting the main body 31 in the first cushioning member 3 may be thicker than the thickness of the plate constituting the partition member 32. For example, at least the first surface P1 and the third surface P3 of the main body may have a thickness ranging from 1.7 to 1.9 mm, and the partition member may have a thickness ranging from 1.2 to 1.4 mm.

As a result, compared to the case where the thickness of the plate constituting the main body 31 is thinner than or equal to the thickness of the plate constituting the partition member 32, there is an advantage in that the ability to absorb collision energy is improved and the load of the cross section received vertically is increased.

In this manner, by a combination of the strength or thickness of the plate forming the first cushioning member 3, it is possible to maximize the ability to absorb an impact of the side sill.

In addition, by forming the plurality of beads 33 in the main body 31 of the first cushioning member 3 in the load direction, the deformation load of the main body is increased, so the ability to absorb collision energy between the first cushioning member and the side sill may be doubled.

In addition, among the methods to which steel is applied, the forming, bending, or roll forming, which is economical and has a high material error rate, may be applied, so it is expected to reduce mold costs during production, and at the same time, material costs may be drastically reduced compared to aluminum through the application of steel.

Therefore, the side sill for a vehicle according to the first embodiment of the present disclosure may secure excellent collision performance, realize cost reduction in terms of materials and construction methods because steel may be applied, and may be lightweight and structurally robust.

FIG. 3 is a diagram illustrating a method of assembling the side sill for a vehicle according to the first embodiment of the present disclosure.

The body is assembled by coupling an under body assembly and a side structure assembly. Here, the side sill inner panel 1 is included in the under body assembly, and the side sill outer panel 2 is included in the side structure assembly.

The side sill inner panel 1 may be coupled to, for example, a center floor panel or a rear floor panel. For the coupling, the bonding such as welding is applied, and thus, the welded portion W may be formed between the center floor panel or the rear floor panel and one side surface of the side sill inner panel.

The first cushioning member 3 may be prepared by molding the main body 31 by machining a single plate of metal such as steel, molding the partition member 32 by machining another single plate of metal such as steel, and bonding the main body and the partition member to each other.

The main body 31 and the partition member 32 may be bent and molded by forming or bending by a press, roll forming, etc., a plate. In addition, the plurality of beads 33 and 34 may be molded on the main body and the partition member.

Both ends of the plate forming the main body 31 may be bent in the first direction (clockwise direction) or the second direction (counterclockwise direction) to form the flange F.

In addition, one flange F of the partition member 32 may be fixed to the inner surface of the first surface P1 of the main body 31 by welding such as spot welding, laser welding, or arc welding using carbon dioxide, etc. The other flange F of the partition member may be fixed to the inner surface of the third surface P3 of the main body by welding such as spot welding, laser welding, or arc welding using carbon dioxide, etc.

As a result, the first cushioning member 3 may have one first closed cross-section C1 partitioned by the partition member 32.

Thereafter, in the side sill for a vehicle according to the first embodiment of the present disclosure, the first cushioning member 3 may be coupled to the under body assembly, that is, the side sill inner panel 1. In this case, the coupling between the first cushioning member and the side sill inner panel may be applied by, for example, the bidirectional spot welding, so the welded portion W may be formed between the flange F of the first cushioning member and the other surface of the side sill inner panel. Accordingly, the bonding between the first cushioning member and the side sill inner panel has the advantage of enhancing the bonding strength.

As a result, the second closed cross-section C2 may be formed between the first cushioning member 3 and the side sill inner panel 1. In this manner, the first cushioning member may constitute the plurality of closed cross-sections C1 and C2 arranged in the width direction Y within the side sill by itself and in combination with the side sill inner panel.

Optionally, the first cushioning member 3 and the side sill outer panel 2 may be bonded. In this case, since one side of the first cushioning member may be shielded or one side of the side sill outer panel may be shielded, and thus, it is difficult to perform normal two-way spot welding, the second surface P2 of the first cushioning member may be bonded to one side of the side sill outer panel using an adhesive for structure and may be provided with the bonded portion B.

Finally, the side sill inner panel 1 and the side sill outer panel 2 may be integrally and structurally bonded stably by forming the welded portion W by applying the bonding such as the bidirectional spot welding at the upper and lower end portions thereof.

Accordingly, the coupling between the under body assembly and the side structure assembly is completed.

FIG. 4 is a cross-sectional view of a side sill for a vehicle according to a second embodiment of the present disclosure, and FIG. 5 is a perspective view of the first cushioning member illustrated in FIG. 4.

The side sill for a vehicle according to the second embodiment of the present disclosure may include a side sill inner panel 1, a side sill outer panel 2, and a first cushioning member 3.

Here, the side sill for a vehicle according to the second embodiment of the present disclosure differs only in that the plurality of partition members 32 of the first cushioning member 3 are disposed, and the rest of the components may be configured and used in the same manner as described in the first embodiment of the present disclosure described above, and therefore, detailed descriptions of the configuration and operation of the remaining components will be omitted.

The first cushioning member 3 may be disposed between the side sill inner panel 1 and the side sill outer panel 2.

For example, as illustrated in FIGS. 4 and 5, the first cushioning member 3 may include a main body 31 formed by bending a single plate and a plurality of partition members 32 connecting both surfaces of the main body. FIGS. 4 and 5 illustrate an example of the f cushioning member having three partition members.

In the side sill for a vehicle according to the second embodiment of the present disclosure, the main body 31 of the first cushioning member 3 may be provided with a plurality of beads 33 that extend in a width direction Y of the vehicle body or the side sill, and are arranged spaced apart from each other along the longitudinal direction X of the first cushioning member or the main body.

In this manner, the plurality of beads 33 may increase an absorbable load amount by improving the stiffness of the vehicle body or the side sill of the first cushioning member 3 in the width direction Y.

The partition member 32 may be bent so that a single plate has an approximately U-shaped cross-sectional shape, and the flange F for bonding with the main body 31 may be formed at both ends.

In the side sill for a vehicle according to the second embodiment of the present disclosure, the partitioning member 32 of the first cushioning member 3 may be provided with a plurality of beads 34 that extend in the height direction Z of the vehicle body or the side sill, and are arranged spaced apart from each other along the longitudinal direction X of the first cushioning member or the partition member.

More specifically, the plurality of beads 34 may be formed to connect the flanges F on both sides of the partition member 32. The beads may extend to the same length as the length of the partition member in the height direction Z.

The plurality of beads 34 may be formed to protrude toward the side sill inner panel 1 or protrude toward the side sill outer panel 2.

The plurality of beads 34 formed on the partition member 32 as described above may improve the stiffness of the partition member itself to maintain the function of the partition member preventing both surfaces (e.g., P1 and P3) of the main body 31 from widening during lateral collision.

The main body 31 and the partition member 32 may be made of, for example, a metal material such as steel, and may be molded together with the plurality of beads 33 and 34 by forming or bending using a press, roll forming, a combination thereof, or the like.

The main body 31 and the partition member 32 may be coupled to each other by welding or the like.

More specifically, one flange F of the partition member 32 may be fixed to an inner surface of the first surface P1 of the main body 31 by welding such as spot welding or laser welding, etc. The other flange of the partition member may be fixed to an inner surface of the third surface P3 of the main body by welding such as spot welding or laser welding, etc.

The length of the partition member 32 in the height direction Z may be formed equal to the length of the second surface P2 of the main body 31 in the height direction Z, and one of the plurality of partition members and the second surface of the main body may be spaced apart from each other at a predetermined distance.

For example, when three partition members 32 are included as illustrated in FIGS. 4 and 5, the first cushioning member 3 may include a first partition member 32*a*, a second partition member 32*b*, and a third partition member 32*c*.

The first partition member 32*a* may be disposed relatively closer to the second surface P2 of the main body 31. The first partition member may first be fixed to the inner surfaces of the first and third surfaces P1 and P3 of the main body by welding.

In this manner, the first cushioning member 3 may form a first closed cross-section C1 between the first partition member 32*a* and the second surface P2 of the main body 31.

Subsequently, the second partition member 32*b* is disposed relatively farther from the second surface P2 of the main body 31 than the first partition member 32*a*, and may be fixed to the inner surfaces of the first and third surfaces P1 and P3 of the main body by welding.

In this manner, the first cushioning member 3 may form a third closed cross-section C3 between the first partition member 32*a* and the second partition member 32*b*. In other words, the third closed cross-section (C3) is formed between partition members, and the number of partition members may increase or decrease according to the number of partition members.

As the plurality of partition members 32 are coupled to the main body while being spaced apart from each other within the main body 31, the first cushioning member 3 itself may have at least the first closed cross-section C1 and the third closed cross-section C3.

The first cushioning member 3 may have a length sufficient to almost fill the inside of the side sill of the vehicle body in the longitudinal direction X.

The first cushioning member 3 has the plurality of partition members 32 that have a shape bent several times and is formed therein, to thereby secure stiffness against impact energy acting in the front and rear as well as impact energy acting in the side of the side sill.

The flange F provided on the main body 31 of the first cushioning member 3 may be joined to the side sill inner panel 1 by welding such as bi-directional spot welding. Accordingly, the welded portion W may be formed between the flange of the first cushioning member and the side sill inner panel.

As a result, the second closed cross-section C2 may be formed between the first cushioning member 3 and the side sill inner panel 1.

For example, in the case of including three partition members 32, the first cushioning member 3 may have the second closed cross-section C2 partitioned by both surfaces of the main body 31, the third partition member 32*c*, and the side sill inner panel 1.

Of course, an additional third closed cross-section C3 may be partitioned between the second partition member 32*b* and the third partition member 32*c*.

In the side sill for a vehicle according to the second embodiment of the present disclosure, an outer surface of the second surface P2 provided on the main body 31 of the first cushioning member 3 may be applied with an adhesive to be bonded to an inner surface of the side sill outer panel 2. Accordingly, a bonded portion B may be formed between the support surface of the first cushioning member and the side sill outer panel.

However, the formation of the bonded portion is not necessarily limited thereto, and optionally, the bonded portion between the support surface of the first cushioning member 3 and the side sill outer panel 2 may be omitted.

The side sill for a vehicle according to the second embodiment of the present disclosure adopts the first cushioning member 3 that has a shape bent several times and is reinforced with the plurality of partition members 32 therein, so the plurality of closed cross-sections C1, C2, and C3 that have a rectangular cross-section inside the side sill and are arranged in the width direction Y of the vehicle body or the side sill may be configured.

The number of closed cross-sections is not limited to the above example. However, the support stiffness and collision performance may be improved due to the increase in the number of partition members 32, but considering that weight and cost increase, 2 to 6 closed cross-sections may be provided inside the side sill.

In this manner, the side sill for a vehicle according to the second embodiment of the present disclosure has the advantage of being able to easily configure the plurality of closed cross-sections C1, C2, and C3 arranged in the width direction Y even if steel is applied, for example.

The plurality of closed cross-sections C1, C2, and C3 may supplement the support stiffness of the side sill itself, directly receive the impact during the lateral collision of the vehicle, and contribute to minimizing the degree to which the side sill enters the interior.

For example, when the impact is transmitted to the first cushioning member 3 through the side sill outer panel 2 during the lateral collision of the vehicle, the plurality of closed cross-sections C1, C2, and C3 may reduce the transmitted impact by using the support stiffness of the complementary linkage structure, and absorb most of the reduced residual impact as the first cushioning member is pushed toward the side sill inner panel 1 and begins to deform.

Similar to the first embodiment, in the side sill for a vehicle according to the second embodiment of the present disclosure, the collision performance of the side sill may be secured by adjusting the material of the plate forming the first cushioning member 3 and the strength or thickness of this material.

In addition, by forming the plurality of beads 33 in the main body 31 of the first cushioning member 3 in the load direction, the deformation load of the main body 31 is increased, so the ability to absorb collision energy between the first cushioning member and the side sill may be doubled.

In addition, among the construction methods to which steel is applied, the forming, bending, or roll forming, which is economical and has a high material error rate, may be applied, so it is expected to reduce mold costs during production, and at the same time, material costs may be drastically reduced compared to aluminum through the application of steel.

Therefore, the side sill for a vehicle according to the first embodiment of the present disclosure may secure excellent collision performance, realize cost reduction in terms of materials and construction methods because steel may be applied, and may be lightweight and structurally robust.

Meanwhile, the assembly method described with reference to FIG. 3 may be equally applied to the method of assembling the side sill for a vehicle according to the second embodiment of the present disclosure.

However, when assembling the side sill for a vehicle according to the second embodiment of the present disclosure, before coupling the first cushioning member 3 to the side sill inner panel 1, the plurality of partition members 32 may be welded and coupled to the main body 31 of the first cushioning member.

FIG. 6 is a diagram illustrating an operation of the side sill for a vehicle according to the second embodiment of the present disclosure, and illustrates the behavior aspect in the performance verification result through the analysis of the side sill for a vehicle according to the second embodiment of the present disclosure.

The present applicant performed performance analysis through simulation for the side sill for a vehicle according to the second embodiment of the present disclosure.

For example, according to the second embodiment of the present disclosure, for the performance of enduring a certain level of collision load by assuming the lateral collision of the vehicle and impacting the side sill in the width direction Y, according to the second embodiment of the present disclosure, the crushing behavior of the side sill for a vehicle having the first cushioning member 3 made of, for example, steel was compared.

As illustrated in FIG. 6, in the side sill according to the second embodiment of the present disclosure, even if the side sill outer panel 2 is deformed during the lateral collision of the vehicle, the first cushioning member 3 may maximize the ability to absorb an impact by inducing the stable crush deformation by the plurality of partition members 32, and increase the support stiffness of the first member by the plurality of beads 33 formed to be relatively adjacent to the inside of the vehicle body in the width direction, to thereby clearly confirm that the remaining space is secured in the side sill.

Meanwhile, the third partition member 32*c* adjacent to the side sill inner panel 1 in the first cushioning member 3 may play a role in resisting the impact load of the side sill during a small overlap collision (collision of only 25% of a driver or occupant side of a full width of the vehicle with an obstacle at a speed of 64 km/h).

To this end, the partition member (e.g., 32*c*) adjacent to the side sill inner panel 1 in the first cushioning member 3 may be disposed between at least a portion of the first surface P1 where the bead 33 is formed and a portion of the third surface P3 where the bead P3 is formed, within the main body 31.

FIGS. 7 and 8 are graphs illustrating deformation forms through analysis of the side sill for a vehicle according to the second embodiment of the present disclosure.

FIG. 7 illustrates a load of cross-section according to a displacement between a side sill (a) of the related art having a cushioning member made of an aluminum extruded material of the same weight and a side sill (b) for a vehicle according to the second embodiment of the present disclosure having a first cushioning member 3 made of, for example, steel.

Here, the side sill (a) of the related art is in the form of a pipe member with a rectangular cross-section, has four partition walls arranged in the width direction Y of the side sill and spaced apart from each other at equal intervals therein, and includes a cushioning member made of an aluminum extruded material having the same weight as the first cushioning member 3 applied in the second embodiment of the present disclosure.

Referring to FIG. 7, it may be seen that the related art (a) is slightly more dominant in the load of the cross section received vertically at the beginning of the collision, but the load of the cross section received vertically in the total deformation is greater in the present disclosure (b).

The side sill of the related art (a) has a cross-sectional load of up to 0.8 MN, while the side sill of the present disclosure (b) has a load of a cross section approximating up to 1.1 MN.

In addition, in the side sill of the present disclosure (b), the entire behavior stops where the displacement is about 135 mm, which shows that it absorbs a larger impact energy within a shorter displacement than the side sill of the related art (a), in which the entire behavior stops in excess of 140 mm.

FIG. 8 illustrates the ability to absorb energy according to a displacement between the side sill (a) of the related art having the cushioning member made of the aluminum extruded material of the same weight and the side sill for a vehicle (b) according to the second embodiment of the present disclosure having the first cushioning member 3 made of, for example, steel.

Referring to FIG. 8, when the same collision energy of about 77 MJ is maximally absorbed, it clearly shows that, in the side sill of the present disclosure (b), the entire behavior stops where the displacement is about 135 mm, and the ability to absorb energy according to the deformation is comparatively superior to the side sill of the related art (a) in which the entire behavior stops in excess of 140 mm.

Therefore, for the side sill a vehicle according to the present disclosure includes a first cushioning member 3 capable of effectively absorbing an impact due to compressive deformation inside the side sill, to thereby increase the support stiffness of the side sill itself and maximize the ability to absorb an impact by inducing stable crush deformation during a collision. As a result, it is possible to minimize the degree to which the side sill enters the interior during the lateral collision of the vehicle, which has the advantage of maximally protecting the occupant and battery safely.

FIG. 9 is a cross-sectional view of a side sill for a vehicle according to a third embodiment of the present disclosure.

The side sill for a vehicle according to the third embodiment of the present disclosure may include a side sill inner panel 1, a side sill outer panel 2, a first cushioning member 3, and a second cushioning member 4.

Here, the side sill for a vehicle according to the third embodiment of the present disclosure differs only in that the second g member 4 is added and disposed in the first cushioning member 3, and the rest of the components may be configured and used in the same manner as described in the first embodiment and the second embodiment of the present disclosure described above, and therefore, detailed descriptions of the configuration and operation of the remaining components will be omitted.

The second cushioning member 4 may be formed long to have a predetermined length in the longitudinal direction X of the side sill, and may be formed as a U-shaped member having a certain width in the width direction X of the side sill and opening downward. As a result, the second cushioning member may bisect the inside of the closed cross-section (e.g., C2) of the first cushioning member 3.

For example, the second cushioning member 4 may be bent several times so that a single plate having a predetermined width and length has a substantially U-shaped cross-sectional shape, and have flanges F for bonding formed at both ends thereof. Among both flanges, one flange may have the length in the height direction Z shorter than the other flange.

In addition, the second cushioning member 4 may be integrally formed by machining a single plate of metal such as steel. The second cushioning member may be molded by forming, bending, roll forming, etc., using a press.

For example, when the second cushioning member 4 is manufactured by the roll forming, it is possible to mold even ultra-high strength steel having a tensile strength of about 980 MPa or more without difficulty. In addition, compared to the forming by the press, the roll forming has the advantage of being easy to compensate for spring back and reducing a corner radius of the second cushioning member.

Here, the thickness of the plate of the second cushioning member 4 may be thicker than that of the plate of the partition member 32.

Optionally, in the side for a vehicle according to the third embodiment of the present disclosure, the second cushioning member 4 may be provided with a plurality of beads (not illustrated) that extend in the width direction Y of the vehicle body or the side sill, and are arranged spaced apart from each other along the longitudinal direction X of the second cushioning member.

The second cushioning member 4 may be inserted into and fixedly installed in one of the plurality of closed cross-sections of the first cushioning member 3. For example, the second cushioning member may be disposed in an inner cross-section (e.g., C2) that is partitioned by the side sill inner panel 1 or closest to the closed cross-section of the plurality of closed cross-sections of the first cushioning member.

Among both flanges of the second cushioning member 4, one flange having a relatively short length in the height direction Z may be fixed to the partition member 32 by welding, etc., and the other flange having a relatively long length in the height direction Z may be interposed between the flange of the first cushioning member 3 and the side sill inner panel 1 and fixed by 3-ply welding, etc. However, the fixing method is not necessarily limited to the above example.

As a result, the side sill including the second cushioning member 4 has the advantage of improving the ability to absorb collision energy and increasing the load of the cross section received vertically compared to the case where only the first cushioning member 3 is provided.

In this the second case, the width of the second cushioning member 4 may be equal to the length of the corresponding closed cross-section C2 within the first cushioning member 3 in the width direction Y.

The second cushioning member 4 formed and arranged in this manner may constitute the inside of the first cushioning member 3.

The side sill for a vehicle according to the third embodiment of the present disclosure includes the first cushioning member 3 and the second cushioning member 4, and may improve the stiffness of the vehicle body or side sill of the first cushioning member in the width direction Y by inserting the second cushioning member into the inner closed cross-section C2 of the first cushioning member to increase the absorbable load amount.

Therefore, it is possible to maximize the ability to absorb an impact of the side sill due to the increase in the load of the cross section received vertically during the lateral collision, and it is possible to maximally suppress the degree to which the side sill enters the interior by stably securing the remaining space after the maximum deformation, to thereby safely protect the occupant and battery.

FIG. 10 is diagram illustrating a method of assembling the side sill for a vehicle according to the third embodiment of the present disclosure.

The method of assembling the side sill for a vehicle according to the third embodiment of the present disclosure may be similarly applied to the method of assembling the side sill for a vehicle according to the first embodiment of the present disclosure described with reference to FIG. 3.

However, when assembling the side sill for a vehicle according to the third embodiment of the present disclosure, before coupling the first cushioning member 3 to the side sill inner panel 1, the second cushioning member 4 and the partition member 32 may be coupled to each other by welding, and then, the second cushioning member and the partition r 32 of the partition member assembly may be coupled to the main body 31.

In this case, the other flange of the second cushioning member 4 having a relatively long length in the height direction Z may contact one flange of the first cushioning member 3.

Thereafter, the first cushioning member 3 into which the second cushioning member 4 is inserted may be coupled to the side sill inner panel 1. The other flange of the second cushioning member having a relatively long length in the height direction Z may be interposed between the flange of the first cushioning member and the side sill inner panel and fixed by 3-ply welding or the like.

Optionally, the bonded portion B may be formed by bonding the first cushioning member 3 and the side sill outer panel 2.

Finally, the side sill inner panel 1 and the side sill outer panel 2 may be integrally and structurally bonded stably by forming the welded portion W by applying the bonding such as the bidirectional spot welding at the upper and lower end portions thereof.

FIG. 11 is a cross-sectional view of a side sill for a vehicle according to a fourth embodiment of the present disclosure, and FIG. 12 is a perspective view and an enlarged view illustrating an installation state of the second cushioning member illustrated in FIG. 11.

The side sill for a vehicle according to the fourth embodiment of the present disclosure may include a side sill inner panel 1, a side sill outer panel 2, a first cushioning member 3, and a second cushioning member 5.

Here, the side sill for a vehicle according to the fourth embodiment of the present disclosure differs only in the shape and arrangement of the second cushioning member 5, and the rest of the components may be configured and used in the same manner as described in the third embodiment of the present disclosure described above, and therefore, detailed descriptions of the configuration and operation of the remaining components will be omitted.

The second cushioning member 5 may be formed of a substantially polygonal cross-section tubular member having a predetermined length in the width direction (x) of the side sill and a predetermined width in the longitudinal direction X of the side sill. Thus, the second cushioning member may have at least one hollow part therein.

For example, the second cushioning member 5 may be formed to have a closed cross-section of a rectangular shape as a whole by using a metal such as steel.

More specifically, the second cushioning member 5 may be made of a plate of 1470 MART steel, 1180 TRIP steel, etc., having a thickness of about 1.7 to 1.9 mm produced by the present applicant.

For example, in the case of the steel, the second cushioning member 5 may include: a main body part 51 formed to have at least one closed cross-section by bending a single plate with a predetermined width and length two or more times and then welding the meeting end portions; and a plate 52 fixed to close one side of the main body part.

In the drawings, the second cushioning member 5 having two rectangular closed cross-sections is exemplified, but the shape of the closed cross-section may be adjusted according to design conditions. As the machining, the roll forming or the like may be used.

For example, when the main body part 51 of the second cushioning member 5 is manufactured by the roll forming, it is possible to mold even ultra-high strength steel having a tensile strength of about 980 MPa or more without difficulty. Moreover, in the roll forming, it is easy to compensate for the spring back compared to the press forming, and it is possible to reduce the corner radius of the main body part, so the high deformation resistance against the collision load may be secured.

One side surface of the plate 52 may be coupled to one side of the main body part 51 by welding, such as arc welding. Accordingly, the second cushioning member 5 may have at least one hollow part with one side closed and the other side open.

As illustrated in FIGS. 11 and 12, the other side surface of the plate 52 may be fixed to the side sill inner panel 1 by welding such as spot welding, laser welding, or arc welding using carbon dioxide.

Here, the thickness of the plate of the second cushioning member 5 may be greater than the thickness of the plate of the partition member 32 constituting the first cushioning member 3.

The second cushioning member 5 may be inserted into and fixedly installed in one of the plurality of closed cross-sections of the first cushioning member 3. For example, the second cushioning member may be disposed in an inner closed cross-section (e.g., C2) that is partitioned by the side sill inner panel 1 or closest to the closed cross-section of the plurality of closed cross-sections of the first cushioning member.

To this end, as described above, the plate 52 of the second cushioning member 5 may be fixed to the side sill inner panel 1 by welding, etc. However, the fixing method is not necessarily limited to the above example.

The second cushioning member 5 may be disposed at a position corresponding to a cross member (not shown) of the vehicle body on the side sill inner panel 1.

However, the arrangement and number of the second cushioning members 5 are not limited to the examples described above and illustrated. However, the support stiffness and collision performance may be improved due to the increase in the number of second cushioning members, but considering that weight and cost increase, 1 to 5 second cushioning members may be provided inside the side sill.

As a result, the side sill including the second cushioning member 5 has the advantage of improving the ability to absorb collision energy and increasing the load of the cross section received vertically compared to the case where only the first cushioning member 3 is provided.

In this case, the width of the second cushioning member 5 may be shorter than the length of the corresponding closed cross-section C2 within the first cushioning member 3 in the width direction Y, and the main body part of the second cushioning member 51 may be spaced apart from the partition member 32.

The second cushioning member 5 formed and arranged in this manner may constitute the inside of the first cushioning member 3.

The side sill for a vehicle according to the fourth embodiment of the present disclosure includes the first cushioning member 3 and the second cushioning member 5, and may improve the stiffness of the body or side sill of the first cushioning member in the width direction Y by inserting the second cushioning member into the inner closed cross-section C2 of the first cushioning member to increase the absorbable load amount.

Moreover, in the case of an electric vehicle, the second cushioning member 5 may locally add the support stiffness for the collision energy during the lateral collision to secure the remaining space in the side sill, to thereby sufficiently protect the battery widely distributed in the lower portion of the vehicle body.

Therefore, it is possible to maximize the ability to absorb an impact of the side sill due to the increase in the load of the cross section received vertically during the lateral collision, and it is possible to maximally suppress the degree to which the side sill enters the interior, to thereby safely protect the occupant and battery.

FIG. 13 is diagram illustrating a method of assembling the side sill for a vehicle according to the fourth embodiment of the present disclosure.

The method of assembling the side sill for a vehicle according to the fourth embodiment of the present disclosure may be similarly applied to the method of assembling the side sill for a vehicle according to the third embodiment of the present disclosure described with reference to FIG. 10.

The first cushioning member 3 may be prepared by molding the main body 31 by machining a single plate of metal such as steel, molding the partition member 32 by machining another single plate of metal such as steel, and bonding the main body and the partition member to each other.

The second cushioning member 5 may be prepared by machining a single plate of metal such as steel, bending the plate two or more times, and welding the meeting end portions to mold the main body part 51, and then bonding the plate 52 of metal such as steel to one side of the main body part.

Before coupling the first cushioning member 3 to the side sill inner panel 1, the second cushioning member 5 is fixed to the side sill inner panel by welding such as spot welding, laser welding, arc welding using carbon dioxide, etc.

Thereafter, the first cushioning member 3 may be coupled to the side sill inner panel 1 to which the second cushioning member 5 is fixed. In this case, the coupling between the first cushioning member and the side sill inner panel may be applied by, for example, the bidirectional spot welding, so the welded portion W may be formed between the flange F of the first cushioning member and the other surface of the side sill inner panel.

Optionally, the bonded portion B may be formed by bonding the first cushioning member 3 and the side sill outer panel 2.

Finally, the side sill inner panel 1 and the side sill outer panel 2 may be integrally and structurally bonded stably by forming the welded portion W by applying the bonding such as the bidirectional spot welding at the upper and lower end portions thereof.

FIG. 14 is a diagram illustrating an operation of the side sill for a vehicle according to the fourth embodiment of the present disclosure, and illustrates the behavior aspect in the performance verification result through the analysis of the side sill for a vehicle according to the fourth embodiment of the present disclosure.

The present applicant performed performance analysis through simulation for the side sill for a vehicle according to the fourth embodiment of the present disclosure.

For example, for the performance of enduring a certain level of collision load by assuming the lateral collision of the vehicle and impacting the side sill in the width direction Y, according to the fourth embodiment of the present disclosure, the crushing behavior of the side sill for a vehicle having the first cushioning member 3 and the second cushioning member 5 made of, for example, steel was compared.

As illustrated in FIG. 14, in the side sill according to the fourth embodiment of the present disclosure, even if the side sill outer panel 4 is deformed during the lateral collision of the vehicle, the first cushioning member 3 may maximize the ability to absorb an impact by inducing the stable crush deformation by the plurality of partition members 32, and increase the support stiffness of the first cushioning member by the plurality of beads 33 formed to be relatively adjacent to the inside of the vehicle body in the width direction. In addition, it could be clearly confirmed that the remaining space in the side sill is secured by adding the high deformation resistance to the collision load in the second cushioning member 5.

FIGS. 15 and 16 are graphs illustrating deformation forms through analysis of the side sill for a vehicle according to the fourth embodiment of the present disclosure.

FIG. 15 illustrates a load of cross-section according to the displacement between the side sill (a) of the related art having a cushioning member made of an aluminum extruded material and the side sill (b) for a vehicle according to the fourth embodiment of the present disclosure having the first cushioning member 3 and the second cushioning member 5 made of, for example, steel.

Here, the side sill (a) of the related art is in the form of a tubular member with a rectangular cross section, and includes a cushioning member of an aluminum extruded material having four partition walls arranged in the width direction Y of the side sill and spaced apart from each other at equal intervals therein.

Referring to FIG. 15, it may be seen that the related art (a) is slightly more dominant in the load of the cross section received vertically at the beginning of the collision, but the load of the cross section received vertically in the total deformation is much greater in the present disclosure (b).

The side sill of the related art (a) has a cross-sectional load of up to 0.8 MN, while the side sill of the present disclosure (b) has a load of a cross section reaching up to 1.4 MN.

In addition, in the side sill of the present disclosure (b), the entire behavior stops where the displacement is about 130 mm, which shows that it absorbs a larger impact energy within a shorter displacement than the side sill of the prior art (a), in which the entire behavior stops in excess of 140 mm.

FIG. 16 illustrates the ability to absorb energy according to the displacement between the side sill (a) of the related art having a cushioning member made of an aluminum extruded material and the side sill (b) for a vehicle according to the fourth embodiment of the present disclosure having the first cushioning member 3 and the second cushioning member 5 made of, for example, steel.

Referring to FIG. 16, when the same collision energy of about 77 MJ is maximally absorbed, it clearly shows that, in the side sill of the present disclosure (b), the entire behavior stops where the displacement is about 130 mm, and the ability to absorb an impact according to the deformation is comparatively superior to the side sill of the related art (a) in which the entire behavior stops in excess of 140 mm.

Therefore, the side sill for a vehicle according to the present disclosure includes the cushioning members 3 and 4 capable of effectively absorbing an impact due to compressive deformation inside the side sill, to thereby greatly increase the support stiffness of the side sill itself and maximize the ability to absorb an impact by inducing stable crush deformation during a collision. As a result, it is possible to minimize the degree to which the side sill enters the interior by stably securing the remaining space after the maximum deformation during the lateral collision of the vehicle, which has the advantage of maximally protecting the occupant and battery safely.

In addition, by forming the plurality of beads 33 in the main body 31 of the first cushioning member 3 in the load direction, the deformation load of the main body is increased, so the ability to absorb collision energy between the first cushioning member and the side sill may be doubled.

In addition, among the construction methods to which steel is applied, the forming, bending, or roll forming, which is economical and has a high material error rate, may be applied, so it is expected to reduce mold costs during production, and at the same time, material costs may be drastically reduced compared to aluminum through the application of steel.

Therefore, the side sill for a vehicle according to the fourth embodiment of the present disclosure may secure excellent collision performance, realize cost reduction in terms of materials and construction methods because steel may be applied, and may be lightweight and structurally robust.

The spirit of the present disclosure has been illustratively described hereinabove. It will be appreciated by those skilled in the art that various modifications and alterations may be made without departing from the essential characteristics of the present disclosure.

For example, the above-described and illustrated embodiments of the present disclosure may be combined with each other, and each embodiment may optionally further employ some components embodiments if necessary.

Accordingly, exemplary embodiments disclosed in the present specification and drawings are not to limit the spirit of the present disclosure, but are to describe the spirit of the present disclosure. The scope of the present disclosure is not limited to these exemplary embodiments. The scope of the present disclosure should be interpreted by the following claims, and it should be interpreted that all the spirits equivalent to the following claims fall within the scope of the present disclosure.

DESCRIPTION OF REFERENCE SIGNS

| | | | |
|---|---|---|---|
| 1: | SIDE SILL INNER PANEL | 2: | SIDE SILL OUTER PANEL |
| 3: | FIRST CUSHIONING MEMBER | 4, 5: | SECOND CUSHIONING MEMBER |
| 31: | MAIN BODY | 32: | PARTITION MEMBER |
| 33, 34: | BEAD | 51: | MAIN BODY PART |
| 52: | PLATE | C1, C2, C3: | CLOSED CROSS-SECTION |
| B: | BONDED PORTION | | |
| F: | FLANGE | W: | WELDED PORTION |

The invention claimed is:

1. A side sill for a vehicle, comprising:
a side sill inner panel;
a side sill outer panel coupled to the side sill inner panel;
a first cushioning member disposed between the side sill inner panel and the side sill outer panel and constituting a plurality of closed cross-sections arranged in a width direction of the side sill; and
a second cushioning member inserted into one of the plurality of closed cross-sections of the first cushioning member and extending in the width direction of the first cushioning member,
wherein the first cushioning member includes a main body formed by bending a single plate, and at least one partition member connecting both surfaces of the main body, and
a plurality of beads are formed on the main body and the partition member,
wherein the second cushioning member is disposed in a second closed cross-section formed between the first cushioning member and the side sill inner panel.

2. The side sill of claim 1, wherein the main body includes a support surface that is located opposite to an open portion of the main body and located between the both surfaces, and
the support surface of the main body and the partition member are spaced apart from each other to form a first closed cross-section between the support surface and the partition member.

3. A side sill for a vehicle, comprising:
a side sill inner panel;
a side sill outer panel coupled to the side sill inner panel;
a first cushioning member disposed between the side sill inner panel and the side sill outer panel and constituting a plurality of closed cross-sections arranged in a width direction of the side sill; and
a second cushioning member inserted into one of the plurality of closed cross-sections of the first cushioning member and extending in the width direction of the first cushioning member,
wherein the first cushioning member includes a main body formed by bending a single plate, and at least one partition member connecting both surfaces of the main body,
wherein a plurality of beads are formed on the main body and the partition member,
wherein the main body includes a support surface that is located opposite to an open portion of the main body and located between the both surfaces,
wherein the support surface of the main body and the partition member are spaced apart from each other to form a first closed cross-section between the support surface and the partition member,
wherein a length of the partition member in a height direction is formed equal to a length in a height direction between both surfaces in the support surface of the main body.

4. A side sill for a vehicle, comprising:
a side sill inner panel;
a side sill outer panel coupled to the side sill inner panel;
a first cushioning member disposed between the side sill inner panel and the side sill outer panel and constituting a plurality of closed cross-sections arranged in a width direction of the side sill; and
a second cushioning member inserted into one of the plurality of closed cross-sections of the first cushioning member and extending in the width direction of the first cushioning member,
wherein the first cushioning member includes a main body formed by bending a single plate, and at least one partition member connecting both surfaces of the main body,
wherein a plurality of beads are formed on the main body and the partition member,
wherein the main body includes a support surface that is located opposite to an open portion of the main body and located between the both surfaces,
wherein the support surface of the main body and the partition member are spaced apart from each other to form a first closed cross-section between the support surface and the partition member,
wherein a flange provided on the main body is bonded to the side sill inner panel, and a welded portion is formed between the flange and the side sill inner panel, and
wherein a second closed cross-section is formed between the first cushioning member and the side sill inner panel.

5. The side sill of claim 1, wherein a thickness of the plate constituting the main body is thicker than that of the plate constituting the partition member.

6. The side sill of claim 1, wherein the plurality of beads of the main body extend in the width direction of the side sill from both surfaces of the main body and are arranged spaced apart from each other along a longitudinal direction of the main body.

7. A side sill for a vehicle, comprising:
a side sill inner panel;
a side sill outer panel coupled to the side sill inner panel;
a first cushioning member disposed between the side sill inner panel and the side sill outer panel and constituting a plurality of closed cross-sections arranged in a width direction of the side sill; and
a second cushioning member inserted into one of the plurality of closed cross-sections of the first cushioning member and extending in the width direction of the first cushioning member, wherein the first cushioning member includes a main body formed by bending a single plate, and at least one partition member connecting both surfaces of the main body, and a plurality of beads are formed on the main body and the partition member, wherein the plurality of beads of the main body extend in the width direction of the side sill from both surfaces of the main body and are arranged spaced apart from each other along a longitudinal direction of the main body, wherein the plurality of beads of the partition member extend in a height direction of the side sill and are arranged spaced apart from each other along a length direction of the partition member.

8. A side sill for a vehicle, comprising:

a side sill inner panel;

a side sill outer panel coupled to the side sill inner panel; and a first cushioning member disposed between the side sill inner panel and the side sill outer panel and constituting a plurality of closed cross-sections arranged in a width direction of the side sill, wherein the first cushioning member includes a main body formed by bending a single plate, and at least one partition member connecting both surfaces of the main body, a plurality of beads are formed on the main body and the partition member, the plurality of beads of the main body extend in the width direction of the side sill from both surfaces of the main body and are arranged spaced apart from each other along a longitudinal direction of the main body, the plurality of beads of the partition member extend in a height direction of the side sill and are arranged spaced apart from each other along a length direction of the partition member, and when the first cushioning member includes a plurality of partition members, at least one of the plurality of partition members is disposed between a portion of the main body where the bead is formed on one side and a portion of the main body where the bead is formed on the other side within the main body.

9. The side sill of claim 1, wherein at least the first cushioning member is made of a plate made of ultra-high strength steel of 980 MPa or more.

10. The side sill of claim 1, wherein the second cushioning member is formed by bending both sides of the second cushioning member to have a certain width in the width direction of the side sill, and one flange of the second cushioning member is fixed to a partition member most adjacent to the side sill inner panel in the first cushioning member, and the other flange of the second cushioning member is fixed to the side sill inner panel.

11. A side sill for a vehicle, comprising:

a side sill inner panel;

a side sill outer panel coupled to the side sill inner panel;

a first cushioning member disposed between the side sill inner panel and the side sill outer panel and constituting a plurality of closed cross-sections arranged in a width direction of the side sill; and a second cushioning member inserted into one of the plurality of closed cross-sections of the first cushioning member and extending in the width direction of the first cushioning member, wherein the first cushioning member includes a main body formed by bending a single plate, and at least one partition member connecting both surfaces of the main body, a plurality of beads are formed on the main body and the partition member, the second cushioning member is disposed in a second closed cross-section formed between the first cushioning member and the side sill inner panel, the second cushioning member is formed by bending both sides to have a certain width in the width direction of the side sill, one flange of the second cushioning member is fixed to a partition member most adjacent to the side sill inner panel in the first cushioning member, and the other flange of the second cushioning member is fixed to the side sill inner panel, and a plurality of beads extending in the width direction of the side sill and arranged spaced apart from each other along a length direction of the second cushioning member are formed on the second cushioning member.

12. A side sill for a vehicle, comprising:

a side sill inner panel;

a side sill outer panel coupled to the side sill inner panel;

a first cushioning member disposed between the side sill inner panel and the side sill outer panel and constituting a plurality of closed cross-sections arranged in a width direction of the side sill; and a second cushioning member inserted into one of the plurality of closed cross-sections of the first cushioning member and extending in the width direction of the first cushioning member, wherein the first cushioning member includes a main body formed by bending a single plate, and at least one partition member connecting both surfaces of the main body, a plurality of beads are formed on the main body and the partition member, the second cushioning member is disposed in a second closed cross-section formed between the first cushioning member and the side sill inner panel, the second cushioning member is formed of a tubular-member having a predetermined length in the width direction of the side sill and a predetermined width in a longitudinal direction of the side sill, and the second cushioning member is fixed to the side sill inner panel.

13. The side sill of claim 12, wherein the second cushioning member includes:

a main body part formed to have at least one closed cross-section; and a plate fixed to the main body part to close one side of the main body part, and the plate is fixed to the side sill inner panel.

14. The side sill of claim 13, wherein the main body part is formed by bending a single plate having a predetermined width and length two or more times and then welding a meeting end portion.

15. The side sill of claim 12, wherein the second cushioning member is disposed at a position corresponding to a cross member of a vehicle body on the side sill inner panel.

16. A side sill for a vehicle, comprising:

a side sill inner panel;

a side sill outer panel coupled to the side sill inner panel;

a first cushioning member disposed between the side sill inner panel and the side sill outer panel and constituting a plurality of closed cross-sections arranged in a width direction of the side sill; and a second cushioning member inserted into one of the plurality of closed cross-sections of the first cushioning member and extending in the width direction of the first cushioning member, wherein the first cushioning member includes a main body formed by bending a single plate, and at least one partition member connecting both surfaces of the main body, a plurality of beads are formed on the main body and the partition member, and the second cushioning member is disposed in a second closed cross-section formed between the first cushioning member and the side sill inner panel, and thickness of the second cushioning member is formed thicker than that of the partition member constituting the first cushioning member.

17. The side sill of claim 1, wherein the second cushioning member is made of a plate made of ultra-high strength steel of 980 MPa or more.

* * * * *